April 1, 1924.

J. R. TOBIN ET AL 1,488,768

INSECT GUARD AND MUZZLE

Filed Sept. 8, 1922

Inventors
John R. Tobin, &
Charles J. Tobin.

By Horace C. Chandler
Attorney

Patented Apr. 1, 1924.

1,488,768

UNITED STATES PATENT OFFICE.

JOHN R. TOBIN AND CHARLES J. TOBIN, OF LANGFORD, SOUTH DAKOTA.

INSECT GUARD AND MUZZLE.

Application filed September 8, 1922. Serial No. 586,964.

*To all whom it may concern:*

Be it known that we, JOHN R. TOBIN and CHARLES J. TOBIN, citizens of the United States, residing at Langford, in the county of Marshall, State of South Dakota, have invented certain new and useful Improvements in Insect Guards and Muzzles; and we do hereby declare the following to be a full, clear, and exact description of the invention, such as will enable others skilled in the art to which it appertains to make and use the same.

This invention relates to new and useful improvements in guards and particularly to guards for use on animals to prevent attacks of insects.

It is well known that, in the cases of draft animals, such as horses, mules, and the like, the gadfly lays its eggs in creases of the lower lip of the animals from whence they pass into the mouth and are swallowed. The sting of these flies is also painful, and renders the animal difficult to manage. It is therefore the particular object of the present invention to provide a shield or guard, to be worn by the animal, especially while working, to protect the lips from the attacks of these flies.

Another object is to provide a device of this character which not only protects the animal from the attacks of insects, but one which will permit the animal to breathe freely.

A further object is to provide a device of this character which is adapted to cover the mouth of the animal, to prevent eating, while at work, and which has means for permitting the escape of saliva.

A still further object is to provide a device of this character which can be worn with comfort by the animals, and which will not rub or chafe the animal's mouth.

Other objects and advantages will be apparent from the following description when taken in connection with the accompanying drawing.

Figure 1:
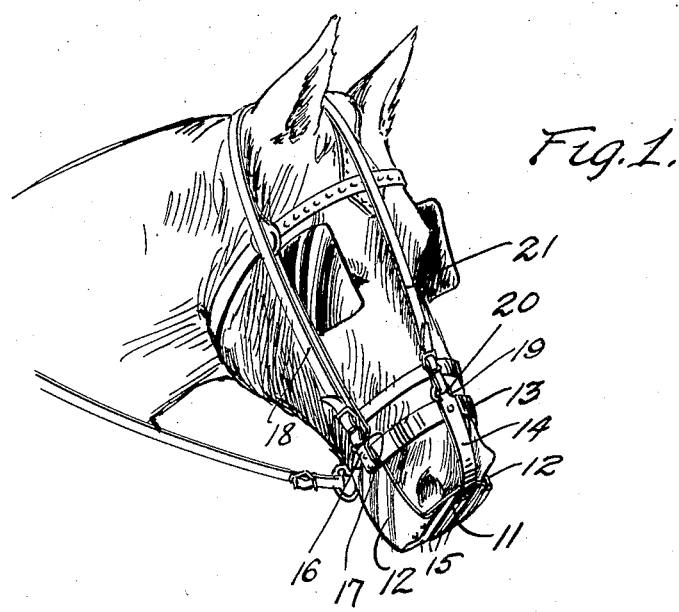
Figure 1 is a perspective view of the invention applied to a horse.
Figure 2:
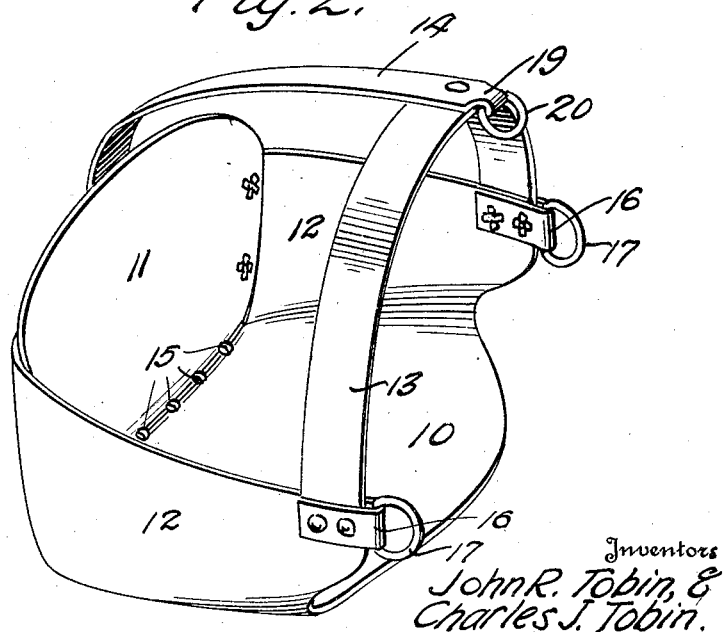
Figure 2 is a perspective view of the device removed from the horse, and showing the interior.

Referring particularly to the accompanying drawing the body of the device is formed from leather, canvas, rubber, or like soft and flexible material, and includes the bottom 10, the front wall 11, and the side walls 12, the body being applied to the animal, as seen in Figure 1, with the bottom wall beneath the animal's chin, the front wall 11 in front of the animal's mouth, while the side walls are disposed at the sides of the animal's mouth, and extend to a sufficient height to protect the upper lip from attack of insects, but not high enough to prevent the proper breathing of the animal. Secured to the rear ends of the side walls 12, and extending upwardly over the animal's nose, behind the nostrils, is a strap 13, and secured to the center of the front wall 11, and extending upwardly on the animal's nose, where it is secured to the center of the strap 13, is a strap 14. Thus between the straps 13 and 14 are formed openings for the nostrils of the animal, to permit free breathing. The front wall 11 extends upwardly to a sufficient height to prevent the animal eating. In the angle formed between the front and bottom walls, and extending across the width of the device, are the series of openings 15, for the escape of saliva, from the animal's mouth.

Carried by the ends of the strap 13 are the rearwardly extending loops 16, each of which carries a ring 17, through which is secured one end of a strap 18. A similar loop 19 is secured to the upper end of the strap 14, and carried by this loop is a ring 20, to which is secured a strap 21. The straps 18 and 21 extend upwardly on the animal's head in the manner of the head straps of the ordinary bridle, and serve to hold the device firmly on the animal's nose and mouth, against any attempts by the animal to remove or dislodge the same.

There is thus provided a device which will protect the nose and mouth from the stinging attacks of insects, and the depositing of eggs by the insects, the device being of such formation and material that it can be comfortably worn, and will not rub or chafe the animal.

What is claimed is:

A device for protecting the mouths of animals from attacks of insects formed from a single piece of flexible material and comprising imperforate bottom, side, and front walls, the bottom wall inclining downwardly and forwardly and meeting the front wall in a fold, the device having a single line of saliva escape openings formed through and extending longitudinally of the fold.

In testimony whereof, we affix our signatures, in the presence of two witnesses.

JOHN R. TOBIN.
CHARLES J. TOBIN.

Witnesses:
CLARENCE J. MILLER,
F. R. HARDING.